(12) United States Patent
Davis et al.

(10) Patent No.: US 7,506,174 B2
(45) Date of Patent: Mar. 17, 2009

(54) METHOD AND SYSTEM FOR ESTABLISHING A BIOMETRICALLY ENABLED PASSWORD

(75) Inventors: Brent L. Davis, Deerfield Beach, FL (US); Shailesh B. Gandhi, Boca Raton, FL (US); Peeyush Jaiswal, Boca Raton, FL (US); James R. Lewis, Delray Beach, FL (US); Fang Wang, Plano, TX (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 808 days.

(21) Appl. No.: 10/980,060

(22) Filed: Nov. 3, 2004

(65) Prior Publication Data

US 2006/0095789 A1     May 4, 2006

(51) Int. Cl.
*H04L 9/00*     (2006.01)

(52) U.S. Cl. .................................... 713/186

(58) Field of Classification Search ............... 713/182, 713/183, 186
See application file for complete search history.

(56) References Cited

U.S. PATENT DOCUMENTS

| | | | |
|---|---|---|---|
| 4,805,222 | A | 2/1989 | Young et al. |
| 5,557,688 | A | 9/1996 | Nakamura |
| 6,084,977 | A | 7/2000 | Borza |
| 6,151,593 | A | 11/2000 | Cho et al. |
| 6,311,272 | B1 | 10/2001 | Gressel |
| 6,405,922 | B1 * | 6/2002 | Kroll .......................... 235/379 |
| 6,442,692 | B1 * | 8/2002 | Zilberman ................. 713/184 |
| 6,507,912 | B1 | 1/2003 | Matyas, Jr. et al. |
| 7,003,670 | B2 * | 2/2006 | Heaven et al. .............. 713/186 |
| 2002/0188854 | A1 | 12/2002 | Heaven et al. |
| 2004/0034788 | A1 | 2/2004 | Ross |

OTHER PUBLICATIONS

Computer-Access Authentication with Neural Network Based Keystroke Identity Verification by Daw-Tun Lin Computer Science Department Chug-Hus Polytecnile Institute Taiwan published IEEE Jun. 1997.*

Computer-Access Security System Using Keystroke Dynamics by Saleh Belha, Charles Slivinsky, and Bassam Hussien published by IEEE Dec. 1990.*

Monrose, F., et al., "Keystroke Dynamics as a Biometric for Authentication", Courant Inst. of Mathematical Sciences, (Mar. 1, 1999).

"BioPassword 4.6: Restoring and Strengthening Password Integrity", BioNet Systems, LLC (2000).

Peacock, A., "Learning User Keystroke Latency Patterns", Coursework, Brigham Young University, (Winter 2000).

* cited by examiner

*Primary Examiner*—Ellen Tran
(74) *Attorney, Agent, or Firm*—Akerman Senterfitt

(57) ABSTRACT

A method (10) and system (50) for using a biometrically enabled password can include an input device (58) capable of entering a password entry and a processor (56) coupled to the input device. The processor can monitor (16 or 26) a cadence such as monitoring a keystroke signature, store the cadence of the password entry, compare (28) the cadence of a subsequent password entry with the cadence of at least one previous password entry, establish (30) a stability metric with respect to the cadences compared, and require (32) both the password entry and the cadence once the cadence meets the stability metric. The processor can require only the password entry until the stability metric for the cadence is achieved. The processor can also determine (14) if the password entry is new and optionally require (18) only the password entry to enter the system if determined as new.

4 Claims, 2 Drawing Sheets

METHOD AND SYSTEM FOR ESTABLISHING A BIOMETRICALLY ENABLED PASSWORD

BACKGROUND OF THE INVENTION

1. Technical Field

This invention relates to the field of password entry systems, and more particularly to a method and system for establishing a biometrically enabled password.

2. Description of the Related Art

Numerous conventional password entry systems exist that monitor keystroke dynamics as a biometric input, where keystroke dynamics can refer to pauses between key presses and key press combinations, duration of key presses, etc. that together form a typing signature that can be used to identify a user. Conventional password entry systems can require a constant monitoring of keystroke dynamics and can require that password entry occur in a fashion consistent with a characteristic keystroke dynamic recorded for an associated user. One drawback of such as system is that it can require users to complete an enrollment process before the users are granted access to the secured system, assuming that the enrollment processes establish a keystroke dynamic for the user.

Further, existing or known systems ignore the fact that for some period of time after creating a new password, a user's keystroke dynamics are not likely to be stable. A user entering a password with multiple characters will typically fail to consistently use the same cadence or pattern of keystrokes, particularly for a newly or recently created password. That is, until a password is "well known" a user can often pause (even slightly) in the entry of the password, which can cause the keystroke dynamics for the password to be different than that user's typical keystroke dynamics.

This difference can be especially pronounced when a strong password is used. A strong password in this context can be a long string of characters, but can also be a short but unusual combination of letters and/or numbers or other characters, the entry of which can cause the user's keystroke dynamics to be abnormal. The stronger the password, the longer the expected time to reach password production stability because strong passwords deliberately avoid stereotypical patterns of characters, which inhibits normal typing patterns. The problem with keystroke dynamics being initially unstable for a password has either not been identified within the field or not addressed as no existing password entry system (as currently known to the inventors herein) holds back on applying a keyboard biometric to a password until biometric characteristics have stabilized or become more consistent.

SUMMARY OF THE INVENTION

Embodiments in accordance with the invention can enable a method and system for password entry using a capture and compare strategy to avoid requiring enrollment. In one aspect of the invention, keystroke dynamics are not used as an additional criterion for entry into a system until the productions have reached an appropriate level of stability when capturing and comparing early productions of new passwords. In other words, systems and methods in accordance with embodiments of the present invention hold back on applying a keyboard (or possibly other) biometric to a password until biometric characteristics have stabilized or become more consistent.

In a first aspect of the invention, a method establishes a biometrically enabled password. The method includes the steps of monitoring a cadence of a password entry (such as monitoring a keystroke signature), storing the cadence of the password entry, comparing the cadence of a subsequent password entry with the cadence of at least one previous password entry, establishing a stability metric with respect to the cadences compared, and requiring both the password entry and the cadence once the cadence to enter a system meets the stability metric. The method can further include the step of determining if the password entry is new and optionally requiring only the password entry to enter the system if the password entry is determined as new. The method can further include the step of requiring only the password entry until the stability metric for the cadence is achieved. Optionally, the user of the system can be alerted if the stability metric is achieved. Note, storing the cadence of the password entry only needs to occur when a correct password is entered, although method and systems contemplated herein can store incorrect passwords as well. Further note, as defined herein, a password entry is separate and distinct from the cadence of the password entry. In a scenario where the cadence of the password entry has stabilized sufficiently and the cadence is then currently required for entry into a system, a correct password entry can have a unrecognized cadence resulting in denial of entry into the system.

In a second aspect of the invention, a system for using a biometrically enabled password can include an input device capable of password entry and a processor coupled to the input device. The processor can be programmed to monitor a cadence of the password entry such as monitoring a keystroke signature, store the cadence of the password entry, compare the cadence of a subsequent password entry with the cadence of at least one previous password entry, establish a stability metric with respect to the cadences compared, and require both the password entry and the cadence once the cadence meets the stability metric to enter a system. The processor can be further programmed to determine if the password entry is new and optionally require only the password entry to enter the system if the password entry is determined as new. The processor can be further programmed to require only the password entry until the stability metric for the cadence is achieved, whereupon the appropriate cadence will also be required. The processor can also alert a user of the system once the stability metric is achieved. As noted above, the storing of the cadence of the password entry can occur when a correct password is entered.

In a third aspect of the invention, a computer program has a plurality of code sections executable by a machine for causing the machine to perform certain steps as described in the method and systems outlined in the first and second aspects above.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

Figure 1:
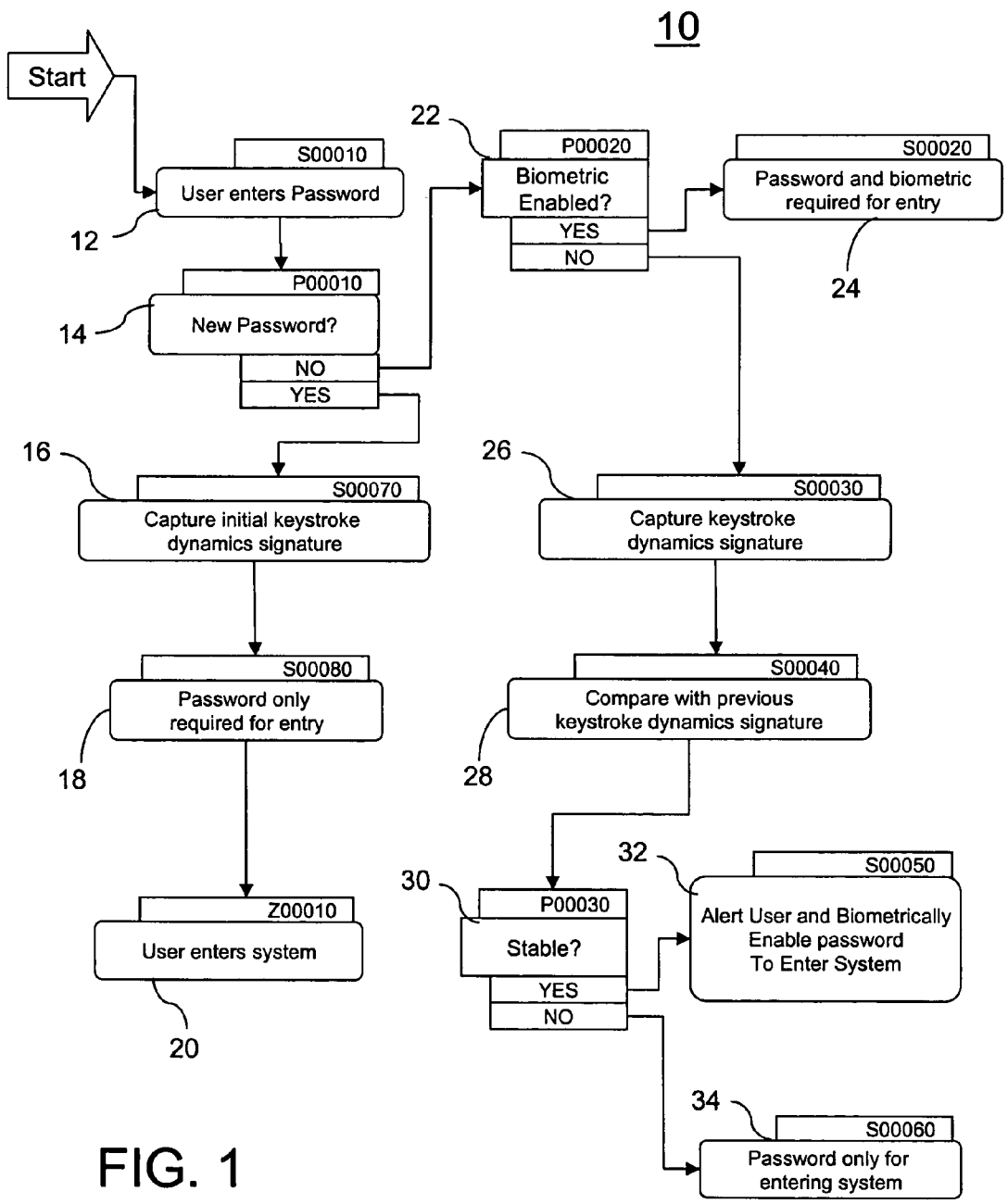
FIG. 1 is a flow diagram illustrating a method of establishing a biometrically enabled password in accordance with an embodiment of the present invention.

Embodiments in accordance with the invention can hold back or delay the application of a biometric to a password until biometric characteristics have stabilized or become more consistent. Rather than requiring a user to complete an enrollment before gaining access to a secured system, a method 10 as illustrated in FIG. 1 can enroll the user by capturing and comparing the keystroke dynamics of the user's initial entries into the system. Once the signature becomes stable, the biometric criterion becomes active. There is some risk associated with leaving the biometric criterion inactive during the initial usage of the password, but the risk is low because the newer a password is, the less likely it is to have been compromised. As the password ages, the likelihood of compromise increases, but the keystroke dynamics biometric would typically also become established. In other words, the stability or consistency in the cadence of the keystrokes increases as the password ages since the user will likely have multiple opportunities to enter the same password. As a safeguard, if a new password has been entered and a sufficiently long predetermined time has passed, then the system can prompt the user for a new password to reduce the likelihood of compromise further.

More specifically referring to the method 10 of FIG. 1, a user can enter a password at step 12 and a determination is made whether the password is new at decision block 14. In accordance with the inventive arrangements, if the password is determined as being new at decision block 14, then the method 10 captures the keystroke dynamics signature of the user input at step 16 and then "holds back" on requiring the biometric at step 18. In other words, since the password is new and the system has no idea whether the user will consistently use the same cadence or keystroke dynamics signature in the future, the method 10 will only require the password at step 18 to enter a secure system at step 20.

If the password is not a new password at decision block 14, then a determination is made whether the entry requirements are biometrically enabled at decision block 22. Assuming the keystroke dynamics signature or the stability or consistency of the cadence of the keystroke entries by a user reach a sufficient threshold or metric (for stability), then the password would have been previously biometrically enabled and both the password and the recognized biometric (having reached the appropriate metric for stability) will be required to enter into a secure system at step 24. If the password is not biometrically enabled yet at decision block 22, then the keystroke dynamics signature is captured at step 26 and compared with previously captured keystroke dynamics signature(s) at step 28. At decision block 30, using the comparisons from step 28, a determination is made whether the keystroke dynamics signature is sufficiently stable (or consistent). The cadence or signature can be determined by measuring the pauses between correct keystrokes in a password and/or by further by measuring the length of time for each of the particular keystrokes in a password. Such measurements can be made in milliseconds for example and thresholds can be set to provide a desired level of consistency. Thus, if the keystroke dynamics signature is found sufficiently stable, then the user can optionally be alerted and the password can then be biometrically enabled at step 32. If the keystroke dynamics signature is not sufficiently stable at decision block 30, then the secure system will still only require the password (without requiring the biometrics) at step 34.

Figure 2:
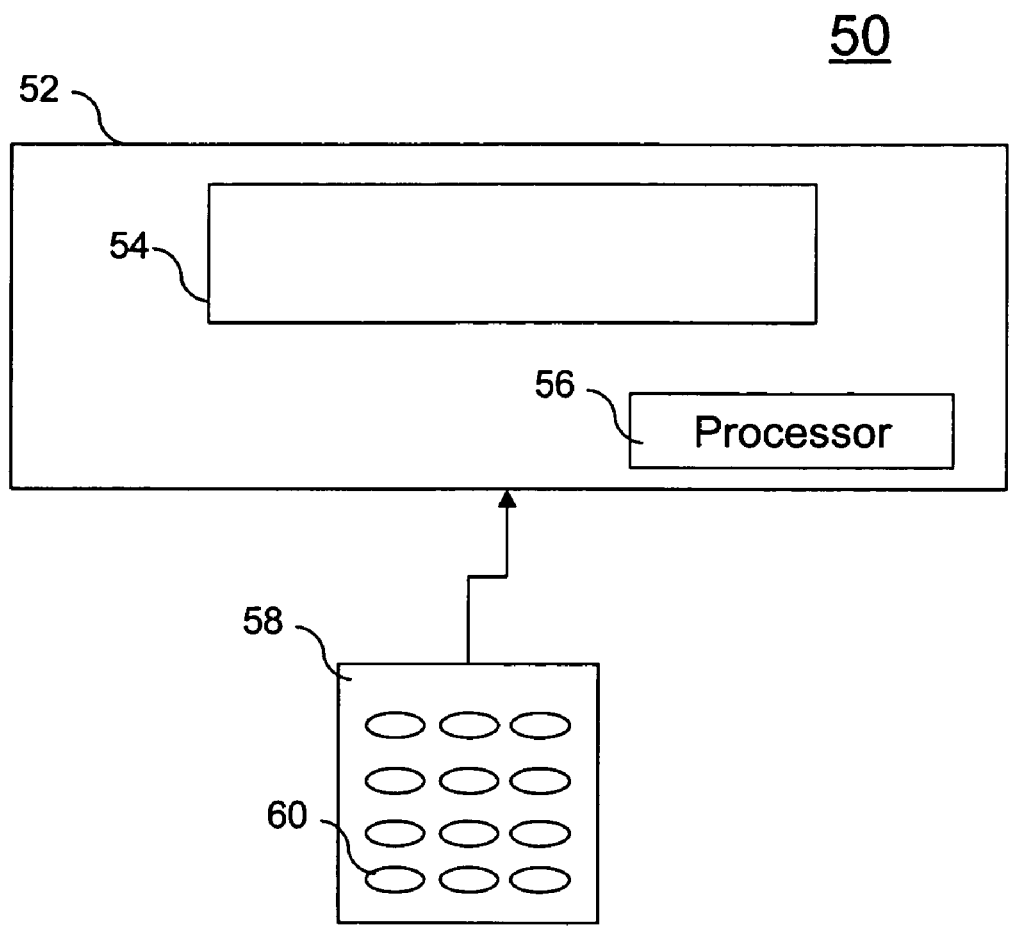
FIG. 2 is a block diagram of a system of establishing a biometrically enabled password in accordance with an embodiment of the present invention.

Referring to FIG. 2, a block diagram illustrates a system 50 for using a biometrically enabled password including an input device 58 such as a keyboard or keypad capable of entering a password entry and a processor 56 coupled to the input device 58. The system 50 can include a secure system 52 having a display 54 or other user interface. The input device 58 can be a keyboard or keypad having button or keys 60. The processor 56 can be programmed to monitor a cadence of the password entry (such as monitoring a keystroke signature), store the cadence of the password entry, compare the cadence of a subsequent password entry with the cadence of at least one previous password entry, establish a stability metric with respect to the cadences compared, and require both the password entry and the cadence (or signature) once the cadence meets the stability metric in order to enter the secure system 52. The processor 56 can be further programmed to determine if the password entry is new and optionally require only the password entry to enter the secure system 52 if the password entry is determined as new. The processor 56 can be further programmed to require only the password entry until the stability metric for the cadence (or signature) is achieved, whereupon the appropriate cadence will also be required. The processor 56 can also alert a user of the secure system 52 once the stability metric is achieved. As noted above, the storing of the cadence of the password entry can occur when a correct password is entered. Note that the terms cadence and signature have been used interchangeably and should both be interpreted broadly herein as any sufficiently unique pattern indicative of a particular user among a group of users.

It should be understood that the present invention can be realized in hardware, software, or a combination of hardware and software. The present invention can also be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or application in the present context means any expression, in any language, code or notation, of a set of instructions intended to cause a system having an information processing capability to perform a particular function either directly or after either both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention;

What is claimed is:

1. A method of gaining access to a secure system, comprising the steps of:

storing a password entered by a user;

capturing and storing a biometric of the password entry;

determining whether the password is new;

if it is determined that the password is new, requiring only the password for access to the secure system;

if it is determined that the password is not new, determining whether the password is biometrically enabled;

if it is determined that the password is biometrically enabled, requiring both the password and the captured biometric for access to the secure system;

if it is determined that the password is not biometrically enabled, comparing the captured biometric with at least one previously captured biometric and determining whether the captured biometric is stable;

if it is determined that the captured biometric is stable, establishing the password as biometrically enabled and requiring both the password and the captured biometric for access to the secure system; and if it is determined that, the captured biometric is not stable, requiring only the password for access to the secure system.

2. The method of claim 1, wherein the method further comprises the step of:

alerting the user of the system if it is determined that the captured biometric is stable.

3. The method of claim 1, wherein the biometric includes a keystroke signature.

4. The method of claim 1, wherein the step of capturing and storing the biometric of the password entry only occurs when a correct password is entered.

* * * * *